UNITED STATES PATENT OFFICE.

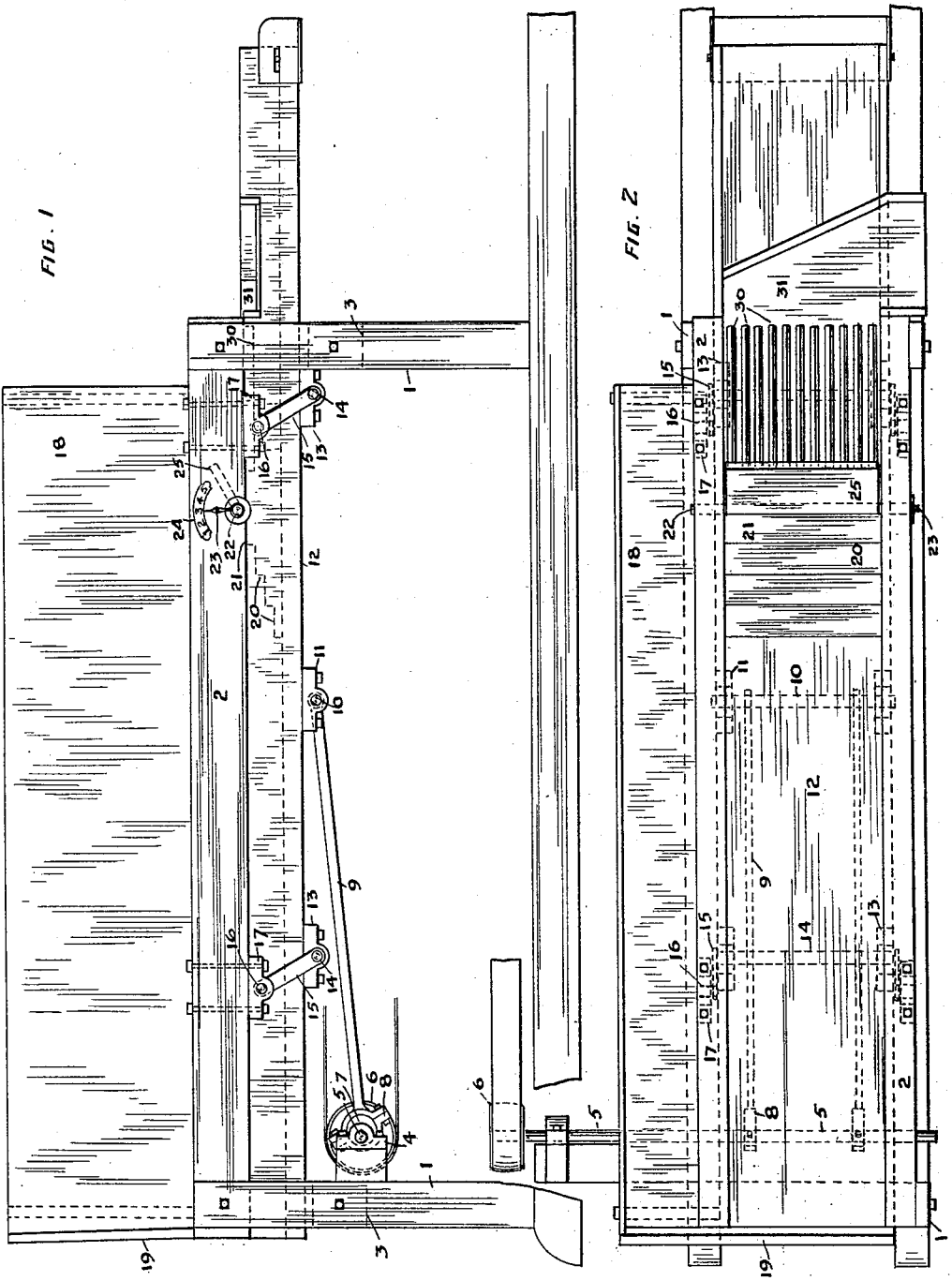

WILLIS PIKE AND JAMES PORTEOUS, OF FRESNO, CALIFORNIA, ASSIGNORS TO FRESNO AGRICULTURAL WORKS, OF FRESNO, CALIFORNIA, A CORPORATION OF CALIFORNIA.

RAISIN FEEDER AND ASSORTER.

1,070,984. Specification of Letters Patent. Patented Aug. 19, 1913.

Application filed April 20, 1911. Serial No. 622,396.

*To all whom it may concern:*

Be it known that we, WILLIS PIKE and JAMES PORTEOUS, citizens of the United States, residing at Fresno, in the county of Fresno and State of California, have invented new and useful Improvements in Raisin Feeders and Assorters, of which the following is a specification.

Raisins are brought to raisin packers in one of three conditions, either in assorted layers, or in the condition known as tray-slipped, in which loose raisins and layer raisins are mixed indiscriminately, or in the condition in which all the raisins are loose, the layers having been previously picked by hand. Raisins in the first named condition are packed without being stemmed.

The apparatus which forms the subject of the present invention is intended for use upon raisins in either of the other two conditions. By means of this apparatus, if the raisins are all loose and are free from layer raisins, they are fed evenly to a stemming machine. If they are a mixture of loose raisins and layer raisins, the layer raisins are by this machine separated from the loose raisins, and removed automatically, or, if desired, they can be fed to a stemming machine together with the loose raisins. Or, again the apparatus may be used without a stemming machine, for the purpose merely of assorting the layer raisins and loose raisins.

The utility of this invention will be apparent by the fact that the differential price in favor of the layer raisins is ½ a cent a lb. In order to save this extra price it has been the practice heretofore to assort the raisins by hand, in the field. This machine will therefore do this work with practically no increase of cost.

In the accompanying drawing, Figure 1 is a longitudinal section of the invention; Fig. 2 is a plan view.

Referring to the drawing, 1 indicates front and rear posts secured at the top by longitudinal beams 2, and at a considerable distance below the top by cross beams 3. To said rear posts 1 are secured boxes 4 for a transverse shaft 5 carrying a pulley 6. Upon said transverse shaft are secured eccentrics 7 which rotate within collars 8 secured to links 9 which extend forwardly and upwardly and are attached to a shaft 10, the ends of which are mounted in boxes 11 secured upon the under side of a shaker 12, which extends longitudinally between said posts 1, and a considerable distance beyond the front posts. Said shaker is secured to boxes 13, in which are transverse shafts 14 connected to upwardly and rearwardly extending links 15, the upper ends of which are pivoted to short shafts 16 in boxes 17 secured to the under sides of said longitudinal beams 2. Upon one of said longitudinal beams is secured a wall 18 extending obliquely outward and upward therefrom, and a wall 19 extends over the rear posts 1 and connects with the wall 18. There is thus formed a feed box which is open at the front and at one side, so that the raisins can be dumped into said feed box at said side, then falling on the rear part of the shaker. The shaft 6 is given a very rapid rotation, about 400 revolutions a minute, so that the shaker is given a similar rapid longitudinal vibration and whereby the raisins thus charged on the surface of the shaker are fed forward thereon, and evenly distributed, and the layer raisins are brought to the surface and above the other raisins. The above construction however, and the result obtained therefrom, form no part of our present joint invention, being the sole invention of Willis Pike, and forming the subject of a separate application filed of even date herewith.

In our improvement we form the bottom of the shaker, at a considerable distance from the part on which the raisins are dumped, with an inclined portion 20, which, as shown in Fig. 1, is in the form of series of steps, which form we have found by trial to be effective for the purpose desired, although other forms may be used. The portion 21 of the bottom of said shaker in front of said steps is raised considerably, and on said raised portion 21, immediately in front of said steps, is mounted a shaft 22, extending through the longitudinal beams 2, and carrying, on the end outside the beam near which the raisins are fed, a pointer 23 adapted to move over a graduated arc 24. Secured to said shaft is a gate 25, which extends obliquely forward. It is found that, by the vibrating motion of the shaker, the raisins climb up said slope or steps 21, and, moreover, climb the upwardly extending gate 25 and drop over the same. The reason why the raisins are caused to ascend said incline or steps 20 appears to be that said shaker, being suspended by said links 21, has a motion which is not horizontal but such that all points in the shaker move in arcs of circles of which the radii are lines parallel and equal to the links. The rate at which the raisins flow over said gate depends upon the angle at which the gate is set, this being shown by the pointer. This is an important feature of our invention, as it enables the machine foreman to regulate the amount of work being done by the machine, and, in consequence, to determine whether the men working in conjunction with the machine are doing the full quantity of work required.

In said application above referred to it is explained that, by the apparatus which forms the subject of that application, the layer raisins are brought to the surface of the loose raisins and are picked off by hand. In our present invention we provide means whereby said raisins are separated automatically from the loose raisins, said means consisting of fingers 30, arranged longitudinally, and spaced from each other at a distance proper to exclude the layer raisins while permitting the loose raisins to drop therethrough. Said layer raisins are thus pushed on to a guideway 31, which discharges them to one side, while the loose raisins, which have dropped between said fingers, passed beneath the guideway, and are conveyed to the stemmer in the usual manner. If, however, it is not desired to separate the layer raisins, the guideway is removed and all the raisins pass to the stemmer.

We claim:—

In combination with a support, a feeder, arms movably connecting said feeder to said support, means for imparting to said feeder a rapid vibration transverse to said arms, an upwardly inclined gate at an end of the feeder, the bottom of the feeder being sloped upward in a series of steps immediately behind said gate, and means for varying the inclination of said gate, substantially as described.

In testimony whereof we have hereunto set our hands in the presence of two subscribing witnesses.

WILLIS PIKE.
JAMES PORTEOUS.

Witnesses:
  F. M. WRIGHT,
  D. B. RICHARDS.

---

Copies of this patent may be obtained for five cents each, by addressing the "Commissioner of Patents, Washington, D. C."